F. W. SCHULZ,

Assignor, by mesne assignments, to J. STUBS & C. H. SMITH.

Road-Scrapers.

No. 7,948. Reissued Nov. 13, 1877.

*Witnesses:*

A. McCallum

D. G. Stuart

*Inventor:*

Friedrich W. Schulz,

By W. B. Richards,

Atty.

N. PETERS, PHOTO-LITHOGRAPHER, WASHINGTON, D. C.

UNITED STATES PATENT OFFICE.

FRIEDRICH W. SCHULZ, OF MOUNT PLEASANT, IOWA, ASSIGNOR, BY MESNE ASSIGNMENTS, TO JESSE STUBS AND CHARLES H. SMITH, OF SAME PLACE.

IMPROVEMENT IN ROAD-SCRAPERS.

Specification forming part of Letters Patent No. 155,759, dated October 6, 1874; Reissue No. 7,948, dated November 13, 1877; application filed October 15, 1877.

*To all whom it may concern:*

Be it known that I, FRIEDRICH W. SCHULZ, of Mount Pleasant, in the county of Henry and State of Iowa, have invented certain new and useful Improvements in Road-Scrapers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to improvements in road-scrapers; and consists, first, in improvements in the method of mounting the scraper-box in the wheel-frame, whereby the machine is adapted to be lowered to work and raised to support its load; second, in the combination of a catch with the scraper-box and the wheel-frame for locking them together; third, in pivoting or hinging a draft-frame to the scraper-box in such manner that the box may be turned forward upon said draft-frame for local transportation.

Figure 1:
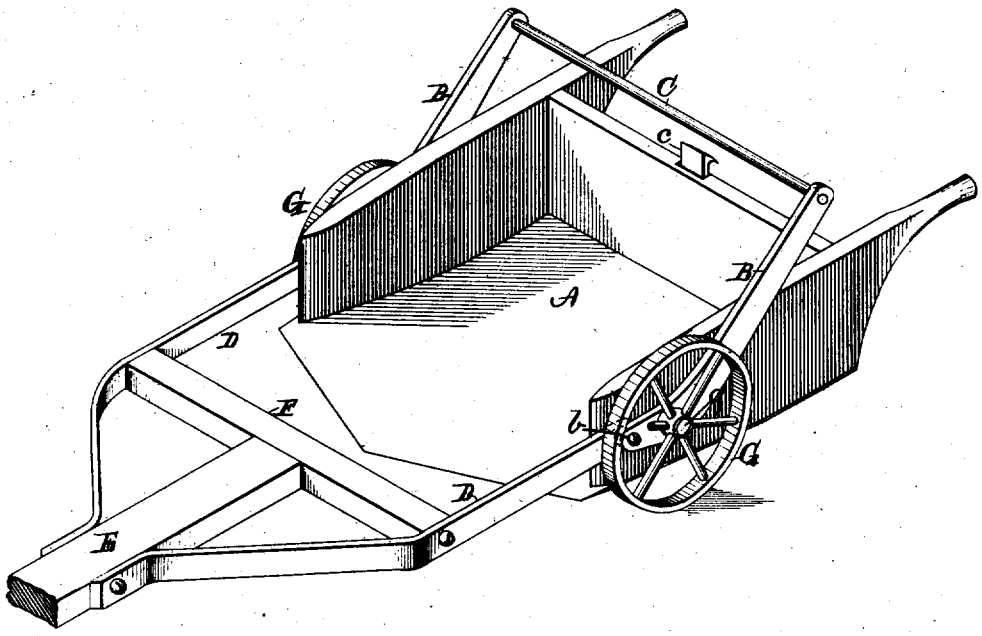
Figure 2:
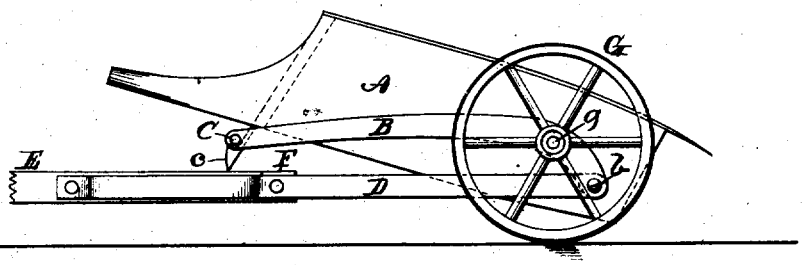

In the accompanying drawings, Figure 1 is a perspective view of a road-scraper embodying my invention, and Fig. 2 a side elevation.

Referring to the parts by letters, A represents a scraper box or body, which may be constructed as shown in the drawing, or in any suitable manner. B B represent two bars, their front ends pivoted by bolts *b b* to the forward end of the scraper-box, and their rear ends connected by a bar, C.

A short distance in rear of the point where the arms B are pivoted, arms *g* are formed upon them, which arms *g* constitute journals for the supporting-wheels G G. Projecting upward from the rear portion of the box A is a catch, *c*.

The size of the wheels G and their position on the arms B, and the manner of hinging the arms B to the scraper-box, are such that when the arm C is disengaged from the catch *c*, it (the arm C) may be raised, and thereby elevate the rear ends of the arms B and depress their forward ends, to allow the box A to descend into working or scraping position.

By pressing down the bar C the front ends of the bars B and the box A may be elevated clear of the ground, and by engaging the bar C with the catch *c* the box A may be secured in an elevated position.

D D represent bars, also hinged or pivoted to the box A by the bolts *b*, and their forward extended ends, converging, have the tongue or draft-pole E fixed between. The rear end of the tongue has a cross-bar, F, the ends of which are bolted to the bars D to brace and support them.

The arms B may be used as levers on the spindles *g* as fulcrums, to raise and lower the scraper-box and control the depth of its penetration of the dirt while loading.

To unload the scraper the catch *c* may be released from the bar C, and allow the forward end of the box A to come to the ground, when its rear end may be elevated and the box turned upside down, as shown at Fig. 2, in which position it again rests upon the wheels G and bar F, and may be carried thereon to the loading-place.

Having thus described my invention, what I claim as new, and desire to secure by Letters Patent, is—

1. In a road-scraper, the frame-bars B B, journaled at their forward ends to the box A, and provided with supporting-wheels G, in combination with the draft-bars D, in such manner that the said box may be turned over upon the draft-bars and supported on the wheels, substantially as and for the purpose specified.

2. The combination of the spring-catch *c* with the frame B B C, the wheels G, and the box A, whereby the said frame may be securely locked to the said box, substantially as and for the purpose specified.

3. In combination with the tongue E, cross-bar F, and bars D D, connected to the tongue and pivoted to the front ends of the sides of the box A, the frame B B C, pivoted to the ends of bars D, and carrying the wheels G G, so that the scraper-box and frame B C may be folded forward and lie upside down upon the tongue and bars D, as set forth.

In testimony that I claim the foregoing I have hereunto set my hand this 4th day of August, 1877.

FRIEDRICH W. SCHULZ.

Witnesses:
THOMAS MCKEE,
W. B. RICHARDS.